(12) United States Patent
Miller et al.

(10) Patent No.: US 8,935,577 B2
(45) Date of Patent: Jan. 13, 2015

(54) METHOD AND APPARATUS FOR FILTERING TRACE INFORMATION

(75) Inventors: Gary L. Miller, Austin, TX (US); Mark Maiolani, East Kilbride (GB)

(73) Assignee: Freescale Semiconductor, Inc., Austin, TX (US)

( * ) Notice: Subject to any disclaimer, the term of this patent is extended or adjusted under 35 U.S.C. 154(b) by 130 days.

(21) Appl. No.: 13/596,886

(22) Filed: Aug. 28, 2012

(65) Prior Publication Data

US 2014/0068345 A1     Mar. 6, 2014

(51) Int. Cl.
*G06F 11/22*     (2006.01)

(52) U.S. Cl.
USPC ............................................................ 714/45

(58) Field of Classification Search
CPC ............ G06F 11/3636; G06F 11/3648; G06F 11/2242; G06F 11/364
USPC ........................................................ 714/1–57
See application file for complete search history.

(56) References Cited

U.S. PATENT DOCUMENTS

| | | | |
|---|---|---|---|
| 5,642,478 A * | 6/1997 | Chen et al. ...................... | 714/45 |
| 6,708,173 B1 * | 3/2004 | Behr et al. ........................ | 1/1 |
| 6,834,365 B2 | 12/2004 | Bardsley et al. | |
| 6,961,872 B2 * | 11/2005 | Yamamoto et al. ............. | 714/34 |
| 7,080,283 B1 * | 7/2006 | Songer et al. ................... | 714/30 |
| 7,149,926 B2 | 12/2006 | Ahmad et al. | |
| 7,702,964 B2 | 4/2010 | John | |
| 8,527,812 B2 * | 9/2013 | Shiina ............................. | 714/30 |
| 8,612,939 B2 * | 12/2013 | Marenco ........................ | 717/128 |
| 2003/0046610 A1 * | 3/2003 | Yamamoto et al. ............. | 714/34 |
| 2004/0052929 A1 | 3/2004 | Kirby et al. | |
| 2005/0289515 A1 * | 12/2005 | Sudo et al. ..................... | 717/124 |
| 2008/0148239 A1 * | 6/2008 | Petrov et al. .................. | 717/128 |
| 2013/0111073 A1 | 5/2013 | Dobbie et al. | |
| 2014/0068344 A1 | 3/2014 | Miller et al. | |

OTHER PUBLICATIONS

Non-Final Office Action mailed May 9, 2014 for U.S. Appl. No. 13/596,881, 21 pages.

* cited by examiner

*Primary Examiner* — Nadeem Iqbal (57) ABSTRACT

In a processing system comprising a plurality of data processors at an integrated circuit die, each data processor has a local debug module. In response to acquiring data trace information based upon a corresponding local filtering criteria, the local debug modules transmit their data trace information to a global resource from each of the local debug modules for further filtering by a common filtering criteria.

18 Claims, 8 Drawing Sheets

METHOD AND APPARATUS FOR FILTERING TRACE INFORMATION

CROSS-REFERENCE TO RELATED APPLICATION(S)

The present application is related to co-pending U.S. patent application Ser. No. 13/586,881, entitled "METHOD AND APPARATUS FOR FILTERING TRACE INFORMATION," filed on Aug. 28, 2012, the entirety of which is herein incorporated by reference.

BACKGROUND

1. Field of the Disclosure

The present disclosure generally relates to electronic devices, and more particular to electronic device having debug capabilities.

2. Description of the Related Art

Debugging of data processors can be accomplished through the use of various tracing techniques, including program tracing and data tracing. Program tracing monitors the fetching and execution of instructions from program memory by a data processor, and captures information (program trace information) that can be used by a debugger to trace the flow of a program being executed by a data processor. Data tracing monitors data accesses to data memory that occur in response to executing program code, and captures information (data trace information) that can be used by the debugger to monitor stored data. Data trace information based upon a write access can be referred to as write access data trace information; while data trace information based upon a read access can be referred to as read access data trace information. A particular technique used to identify when trace information is to be captured uses a trace window to indicate an address range for which trace information is to be captured. For example, a data trace window, which identifies a memory address range to be monitored, can be used that is sufficiently large to include those address locations where data of interest is stored.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-11 illustrate example techniques for filtering data trace information that is received at a global debug controller from a plurality of local debug controllers. In at least one embodiment, a tag Random Access Memory (RAM) stores a filtering criteria that is used to filter a particular data trace information that includes the address, data, and attributes of a data access request captured by a local debug controller and the data information being accessed by the request (a data trace data). To illustrate, the global debug controller can provide a portion of the data trace address of the particular data trace information to a tag RAM at which a filtering criteria is stored. A tag bit may be associated with a plurality of addresses. As used herein, the term tag RAM is intended to mean a plurality of storage locations and associated logic that in response to receiving an address, such as a data trace address, will determine a state of a storage location, such as a bit of the tag RAM (a tag bit), that corresponds to the received address. If the returned tag bit is asserted, the global debug controller will maintain the particular data trace information being evaluated; otherwise, if the returned tag bit is negated, the particular data trace information being evaluated is discarded. Various embodiments of the present disclosure will be better understood with reference to FIGS. 1-11.

Figure 1:
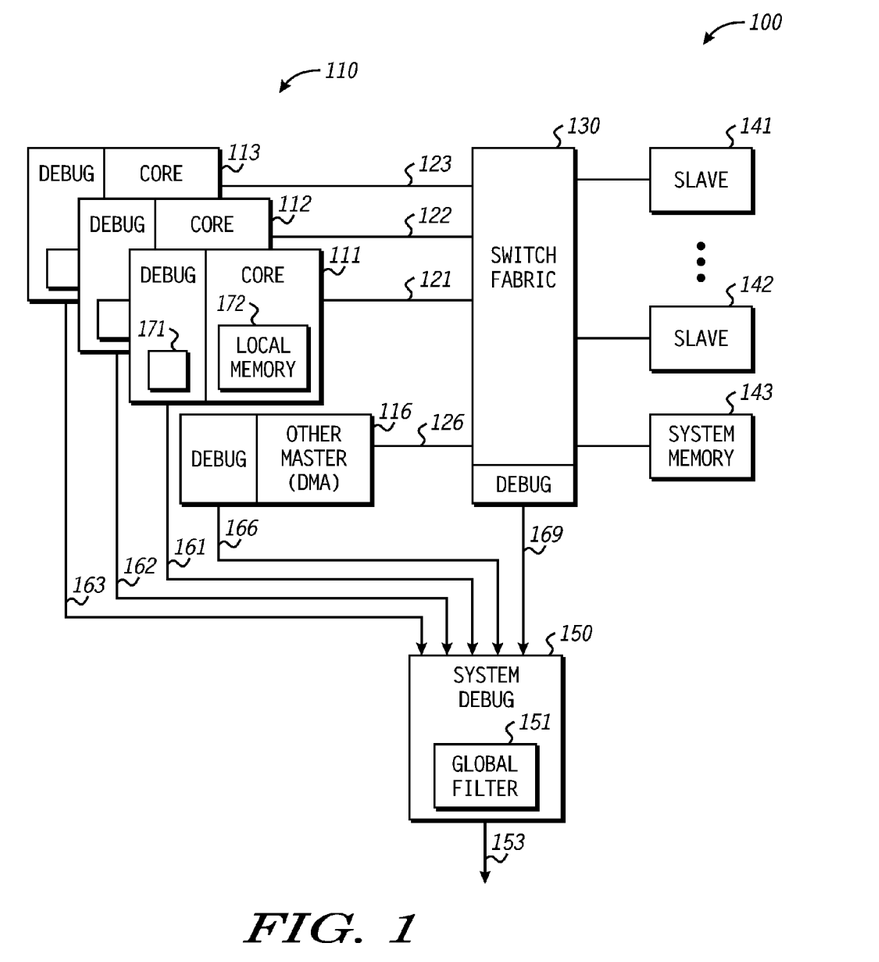
FIG. 1 is a block diagram of a processing system in accordance with a specific embodiment of the present disclosure.

FIG. 1 illustrates a processing system 100 employing a global data trace filtering criteria at a system debug module that is a common filtering criteria used to filter data trace information acquired from a plurality of debug clients. In the illustrated example, the processing system 100 includes a switch fabric 130 that communicates information amongst a plurality of master and slave devices. The master devices connected to the switch fabric 130 include a direct memory access (DMA) module 116, and general-purpose instruction based data processors 111-113. The slave devices connected to the switch fabric 130 include slave modules 141-143, where slave module 143 is specifically illustrated to be a system memory device.

The general purpose instruction-based data processors 111-113 can each be of the same or different type. For purposes of discussion, it is presumed that each of the data processors 111-113 are of the same type as data processor 111, which is illustrated in greater detail at FIG. 1 to include a core portion (CORE) and a debug portion (DEBUG). The core portion of data processor 111 is connected to the switch fabric 130 via an interconnect 121, and includes a local memory 172. The debug portion of data processor 111 is connected to the system debug module 150 via interconnect 161, and includes a filter module 171 that is dedicated to debugging the data processor 111 by applying a filtering criteria that is local to data processor 111. Similarly, core portions (not shown) of data processor modules 112, 113 are connected to the switch fabric 130 via corresponding interconnects 122, 123, while debug portions (not shown) of data processor modules 112, 113 are connected to the system debug module 150 via corresponding interconnects 162, 163. DMA 116 includes a core portion that is connected to the switch fabric 130 by interconnect 126, and a debug portion that is connected to the system debug module 150 via interconnect 166.

Each of the slave modules 141-143 are connected to the switch fabric 130 by a corresponding interconnect and can be accessed by master devices of the processing system 100. System debug module 150 is connected to a debug portion of the switch fabric 130 via interconnect 169, and to an interconnect 153, referred to as a debug port, through which debug information is communicated. According to a particular embodiment, the debug port 153 can be an external debug port that can be connected to an external debug system to transmit information. The debug port 153 can alternatively be used to transmit trace information to an internal memory or other memory map location for storage or handling. The system debug module 150 is further illustrated to include a global filter 151 that has a common filtering criteria that is applied to each of the trace information received from various debug clients.

The various debug modules are clients of the system debug module 150, and, therefore, can be referred to as client debug modules. In operation, the various client debug modules monitor operations of their corresponding master device to determine when data trace information is to be collected based upon the local filtering criteria enforced by their corresponding local filter. For example, the debug module of data processor 111 can monitor operation of its core portion based upon a local filtering criteria of filter module 171 to determine when to enable collection of data trace information.

According to an embodiment, a data trace window can be used to enable and disable data trace collection based upon whether the address of a data access is within, or outside of, the trace window. In response to enabling data trace collection during a write access request, write access data trace information will be captured, including the address of the write access and the data value being stored. The trace information collected in response to meeting the local filtering criteria are communicated to the system debug module 150, wherein a global filter module 151 applies a global filtering criteria to further filter the data trace information received from various local debug modules. Operation of the processing system of FIG. 1 will be better understood with respect to FIGS. 2-10.

Figure 2:
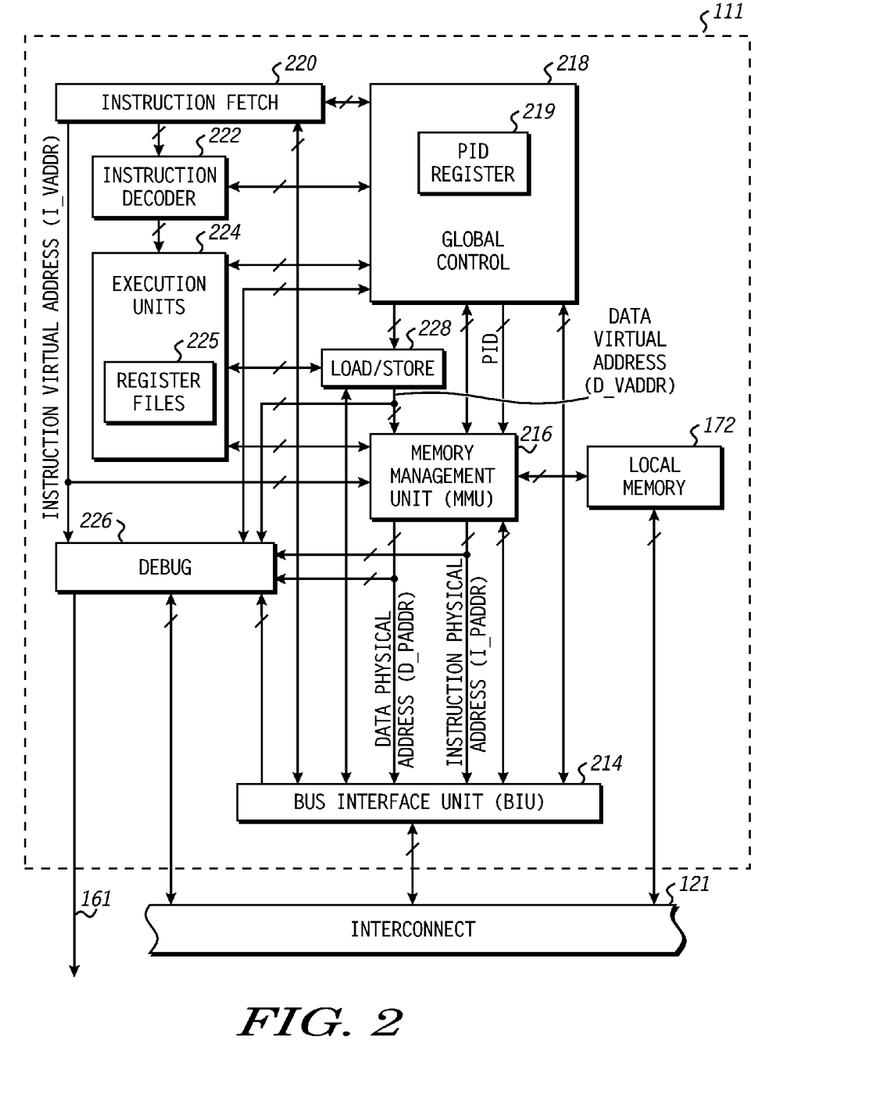
FIG. 2 is a block diagram illustrating a data processor of FIG. 1 in greater detail in accordance with a particular embodiment of the present disclosure.

Illustrated at FIG. 2 is a particular embodiment of the general purpose instruction-based data processor 111 of FIG. 1. A bus interface unit (BIU) 214 is connected to interconnect 121. BIU 214 is connected to memory management unit (MMU) 216. MMU 216 is connected to a first input/output terminal of a global control module 218. A second input/output terminal of global control module 218 is connected to a first input/output terminal of an instruction fetch unit 220. Instruction fetch unit 220 has an output connected to an input of an instruction decoder 222. An output of instruction decoder 222 is connected to an input of execution units 224. In one form, execution units 224 include at least one arithmetic logic unit, at least one floating point unit and at least one multiplier module. Within the execution units 224 are register files 225. An input/output terminal of instruction decoder 222 is connected to a third input/output terminal of the global control module 218. A first input/output terminal of execution units 224 is connected to a fourth input/output terminal of global control module 218. Execution units 224 and instruction fetch unit 220 are also connected to MMU 216. A load/store unit 228 has a first input/output terminal connected to a sixth input/output terminal of global control module 218. Load/store unit 228 has a second input/output terminal connected to a first input/output terminal of BIU 214. Load/store unit 228 has a third input/output terminal connected to a second input/output terminal of execution units 224. A second input/output terminal of BIU 214 is connected to a seventh input/output terminal of global control module 218. An output of load/store unit 228 provides a data virtual address (D_VADDR) and is connected to a first input of MMU 216 and a first input of debug module 226. An output of instruction fetch unit 220 provides an instruction virtual address (I_VADDR) and is connected to a second input of MMU 216 and a second input of debug module 226. A first output of MMU 216 provides a data physical address (D_PADDR) and is connected to a first input of BIU 214 and to a third input of debug module 226. A second output of MMU 216 provides an instruction physical address (I_PADDR) and is connected to a second input of BIU 214 and to a fourth input of debug module 226. The local memory 172 is connected to the MMU 216 via an interconnect. Debug module 226 has a second input/output terminal connected to interconnect 161.

In the illustrated form, BIU 214, MMU 216, global control module 218, instruction fetch unit 220, instruction decoder 222, execution units 224 with register files 225, debug module 226, load/store unit 228, and memory 172 collectively form the general-purpose instruction based processor 111 as indicated by the dashed line grouping in FIG. 2. The debug module 226 represents the debug portion of the data processor 111, and the remaining portions of FIG. 2 represent the core portion of the debug processor 111. While various modules of FIG. 2, and other figures, are illustrated in a segregated locations with specific connections, it will be understood that such modules may also be implemented in a distributed manner and be included within various other blocks of data processing system 100. For example, the storage locations described herein at the debug module 226 can be part of the register files 225 or other portion of the data processor 111. Also, in the illustrated embodiment, global control 218 includes a process identifier (PID) register 219 that stores a process identifier (PID) for the currently executing process. Global control 218 also provides the PID to MMU 216.

In operation, various modules of data processor 111 can communicate information with local memory 172, and other data processor modules, via MMU 216. Data processor 111 can communication with system memory 143 and with other devices connected to interconnect 121 via BIU 214. Instruction fetch unit 220 retrieves data processor instructions (i.e. program instructions) from BIU 214 under control of global control module 218. The retrieved instructions are sequentially communicated to instruction decoder 222 for decoding under control of global control module 218. Execution units 224 execute instructions and generate data that is either stored in a cache (not shown), in the local memory 172 via MMU 216, or routed to system memory via BIU 214 and interconnect 121. For purposes of discussion, it is presumed that local memory 172 is a volatile random access memory (RAM) stores data information, but not data processor instruction. Debugging of the operation of data processor 111 is performed by debug module 226, which generates debug information for further analysis, such as by an external development system (not shown). The data processor 111 enters a debug mode of operation in response to activation of the debug module 226, such as by an external development system via interconnect 161.

In the illustrated form, debug module 226 is configured to monitor information being communicated via various interconnects of data processor 111. For example, interconnects that communicate information to and from the instruction fetch module 220 can be monitored by the debug module 226 to trace data processor 111 program execution; while interconnects that communicate information to and from local memory 172 can be monitored by the debug module to trace data accesses to the local memory 172. It will be appreciated, that the local debug module 226 can also monitor other resources of data processor 111, such as the interface with the interconnect 121. The monitored information includes data values being communicated to/from memory locations, the addresses of those memory locations, and the access attributes. Addresses can include data virtual addresses, data physical addresses, program (instruction) virtual addresses, program physical addresses, data information from BIU 214, and load/store unit 228, and information from global control 218. A data address of the data memory is an address of program memory where data resides whereas a program address is an address where an instruction resides. Program virtual addresses are provided from instruction fetch unit 220 to the debug module 226 and MMU 216. A virtual address is an un-translated address which requires some further processing or translating to obtain a translated address of the physical storage location where the information is residing. MMU 216 provides instruction physical addresses to BIU 214 and debug module 226 by translating addresses of virtual pages of memory to corresponding physical page addresses. Debug module 226 forms a debug message to be communicated to a location external data processor 111.

Figure 3:
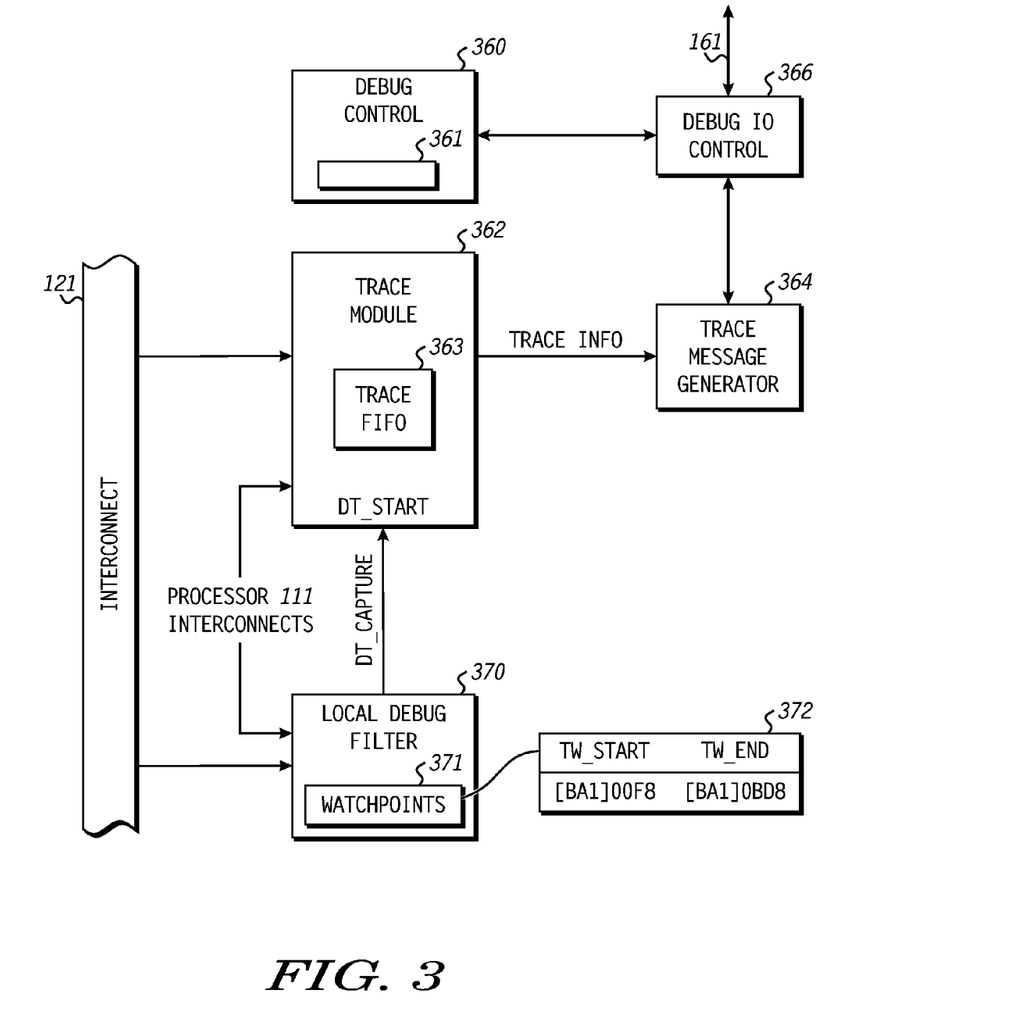
FIG. 3 is a block diagram illustrating a debug control module of FIG. 2 in greater detail in accordance with a particular embodiment of the present disclosure.

Illustrated in FIG. 3 is an exemplary embodiment of the debug module 226 of FIG. 2 that includes debug control module 360, trace module 362, local debug filter 370, debug input/output (I/O) module 366, and trace message generator 364. Debug control module 360 is used to control operation of the debug module 226, and is connected to interconnect 161 via debug I/O control module 366 to communicate external from the data processor 111, and to other modules of FIG. 3 (not shown). According to a particular embodiment, interconnect 161 can include a standardized interface, such as a JTAG (Joint Test Access Group) interface, that meets a particular standard. For purposes of discussion, various connections between features disclosed the present figures, including FIG. 3, are illustrated with arrows indicative of a particular direction of data flow with respect to an embodiment described herein. It will be appreciated, however, that the arrow indications are not intended to indicate a connection can only transmit information in a particular correctional manner, such as the bidirectional or unidirectional manner.

Debug control module 360 includes a register 361 that can store information used to control operation of the debug control module 226. For example, register 361 can include: a field labeled DEBUG_EN that when asserted enables operation of the debug module 226; a field labeled PGM_TRACE_EN that when asserted enables program trace messaging to be performed, assuming DEBUG_EN is asserted; a field labeled DATA_TRACE_EN that when asserted enables data trace messaging to be performed, assuming DEBUG_ENABLE is asserted and assuming that the debug module 226 is otherwise configured t capture data information; and the like. During operation, the debug control module 360 can receive information from external the data processor 111, e.g., via the debug I/O control module 366, such as commands that when executed retrieve and store data information at various storage locations of debug module 226 or data processor 111, commands that control operation of the debug module 226, and the like. An example of a debug command that can be executed by the debug control module 360 includes a command that writes to fields of register 361 to enable/disable debug operation.

When operation of the debug module 226 is enabled, e.g., the field DATA_TRACE_EN is asserted, the local filter module 372 monitors operation of the processing system 111 to detect the occurrence of various system events, referred to as watchpoint events, that can control the manner in which the debug module 226 operates. Various types of watchpoints exist, each of which can be enabled based upon information stored at the watchpoints registers 371. For example, watchpoint registers 371 are illustrated to include a register 372 that is associated with a specific type of watchpoint, referred to as a data trace window, that specifies a trace window, e.g., a particular address range that is to be traced.

For purposes of discussion, the trace window of register 372 is presumed to be a data trace window, as opposed to a program trace window. The register 372 includes a field labeled TW_START that is programmed to a starting address (0x[BA1]00F8) of the data trace window, and a field labeled TW_END that is programmed to a last address (0x[BA1]0BD8) of the data trace window, wherein [BA1] represents a base address of the local memory 172 of data processor 111. In operation, the local filter module 370 monitor interconnects of data processor 111 by comparing address information for current data accesses to determine if the access is within the data trace window of register 372. The local debug filter 370 will assert signal DT_CAPTURE in response to determining that the address of a current data access is within the data trace window; otherwise, the signal DT_CAPTURE will be negated. Operation of the local filter module 370 will be better understood in reference to FIG. 4, below.

Trace module 362 includes an input DT_ON that is connected to the local debug filter 370 to receive the signal labeled DT_CAPTURE. In response to signal DT_CAPTURE being asserted, trace module 362 will capture data trace information pertaining to the current data access. For example, the trace module 362 will capture address and data information from a bus of data processor 111 over which data access requests are communicated. Captured trace information is stored at the trace FIFO 363 for additional handling by the debug module 226.

Figure 4:
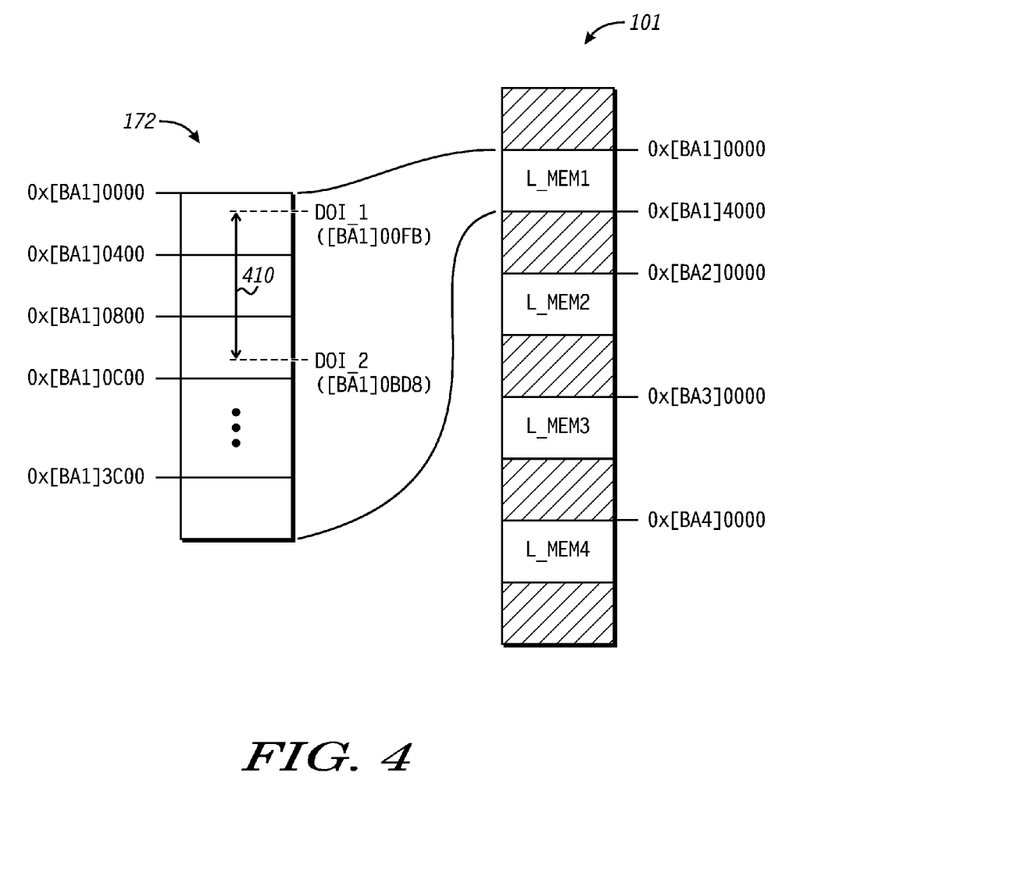
FIG. 4 is a block diagram illustrating a memory map and local memory of the memory system of FIG. 1 in accordance with a particular embodiment of the present disclosure.

FIG. 4 illustrates a unified memory map 101 of the data processing system 100 of FIG. 1. Memory map 101 includes: an address range labeled MEM1 that represents the location of local memory 172 of data processor 111; an address range labeled MEM2 that represents the location of local memory of data processor 112; an address range labeled MEM3 that represents the location of local memory of data processor 113; and an address range labeled MEM4 that represents the location of system memory 143. The size of the memory ranges MEM1-MEM4 can vary based upon the actual size of memories they represent.

The beginning address of each of the memory regions MEM1-MEM4 are aligned to respective 64 Kilo byte (kB) boundaries: 0x[BA1]0000, 0x[BA2]0000, 0x[BA3]0000, and 0x[BA4]0000. Wherein, [BA1] represents a base address of memory region MEM1, [BA2] represents a base address of memory region MEM2, [BA3] represents a base address of memory region MEM3, and [BA4] represents a base address of memory region MEM4. For purposes of discussion, the memory region MEM1, which corresponds to local memory 172 of data processor 111, is presumed to have a 16 kB address space, wherein only the fourteen least significant bits [b13:b0] of the address are used to access a particular byte of the memory. Thus, the address of the top-most byte of region MEM1 is 0x[BA1]0000, and the address of a bottom-most byte of the memory range MEM1 is 0x[BA1]3FFF, e.g., the address of the next byte following memory location MEM1 is 0x[BA1]4000, as illustrated in FIG. 4.

Also illustrated at FIG. 4 is a block diagram of the 16 kB local memory 172 of data processor 111, which corresponds to memory region MEM1 of the unified memory map 101. As discussed above, it is often desirable during debug operation to monitor only specific data values, which are stored a particular memory location. Two locations of local memory 172, DOI_1 and DOI_2, containing data of interest are identified, wherein data of interest is information that is to be monitored during operation of data processor 111. In particular, the first data of interest DOI_1 is stored at memory location 0x[BA1]00F8 and the second data of interest DOI_2 is stored at memory location 0x[BA1]0BD8. It is assumed for purposes of discussion that processor 111 supports 64-bit data words, and therefore, the memory locations for DOI_1 and DOI_2 are aligned to 8-byte boundaries of local memory 172. A data trace window, represented by arrow 410, has been programmed that includes the addresses of DOI_1 and DOI_2, such that data access requests to DOI_1 and DOI_2, as well as to other addresses, will be detected as access requests to the data trace window.

Because only two data addresses need to be monitored, the trace window 410 is defined by programming the field TW_START of the trace window register 372 to the address of DOI_1(0x[BA1]00FB), and programming the field TW_END to the address of DOI_2(0x[BA1]0BD8). In the present example, the trace window address range includes 349 64-bit data words, each of which will be traced even though only two 64-bit address locations within this range contain data of interest. It will be appreciated, that while data trace windows have been specifically described with respect to capturing data trace information, that other watchpoints based upon other system criteria can be also be used to capture data trace information.

The captured information stored at FIFO 363 is accessed by the trace message generator 364, which can format and transmit the trace information, via debug IO control module 366, to the system debug module 150 (FIG. 1) for further processing. The debug modules of each of the other masters of the processing system 100 can operate in a similar manner as debug module 226 to capture data trace information meeting various local filter requirements, and to transmit data trace information to the system debug module 150.

Figure 5:
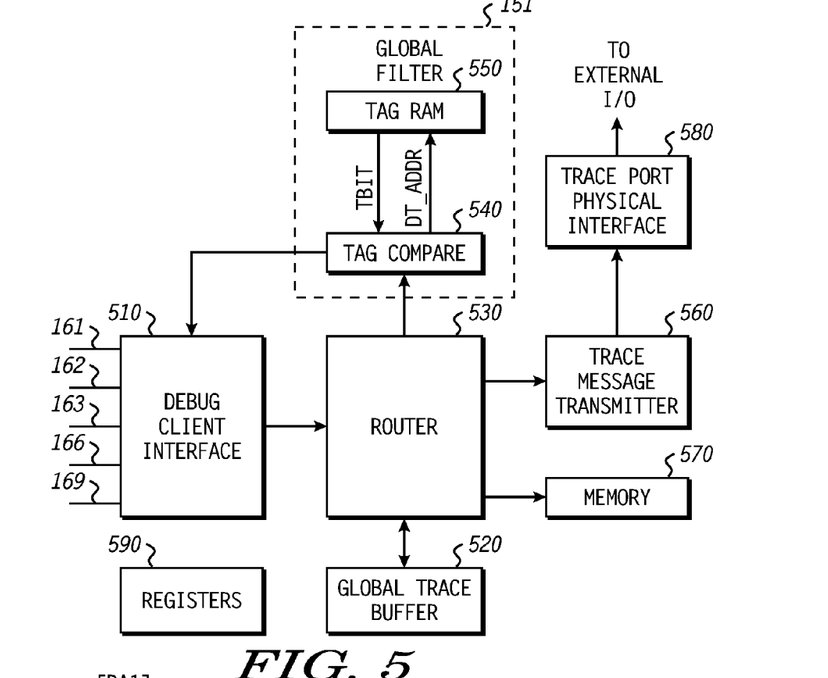
FIG. 5 is a block diagram illustrating a system debug module of FIG. 1 in greater detail in accordance with a particular embodiment of the present disclosure.

FIG. 5 illustrates the system debug module 150 in greater detail to include a debug client interface 510, a global trace buffer 520, a router module 530, a tag RAM compare module 540, a tag RAM 550, the trace message transmitter 560, the global I/O control module 580, a memory 570, and registers 590.

Debug client interface 510 is connected to receive all kinds of trace information from various masters of data processing system 100 via interconnects 161-163, 166, 169, and from tag compare module 540. Received data trace information is provided to the router 530, which is connected to the tag compare module 540, the trace message transmitter 560, the memory 570, and to the global trace buffer 520. It is presumed that router 530 stores data trace information received from the debug client interface 510 at the global trace buffer 524 for subsequent handling, though it will be appreciated that in other embodiments, received data trace information does not need to be buffered before being routed to other locations.

Data trace information stored at the global trace buffer 520 is accessed by the router 530, which determines whether the data trace information is to be routed to the tag comparator 540 for additional filtering, routed to the trace message transmitter, or routed to memory 570. Registers 590 can have a GLOBAL_FILTER_EN field (not shown) that if asserted results in the data trace information being further filtered by the tag compare module 540, as described below. Otherwise, if the GLOBAL_FILTER_EN field is negated, the data trace information is provided to the trace message transmitter or to the memory 570. The trace message generator 560 can format data trace information received from router 530 in a particular format before for transmitting the data trace information to an external debugger via the global I/O control 580. Alternatively, the router 530 can forward the data trace information for storage at a memory 570, which can be system memory, or memory local to the system debug module.

If the filter information at registers 590 indicates that data trace information is to be filtered further, router 530 will provide data trace information retrieved from the global trace buffer 520 to the tag compare module 540 for additional filtering. The tag compare module 540 provides a data trace address (DT_ADDRESS) of a particular data trace information to tag RAM 550, and in return receives a bit, referred to as a tag bit (TBIT), from the tag RAM 550. The tag bit is retrieved from a location of tag RAM 550 that corresponds to the provided data trace address. If the returned tag bit is asserted, the data trace information being evaluated is sent to the debug client interface, and therefore is maintained by virtue of meeting the filter criteria stored at tag RAM 550. Otherwise, the trace information being evaluated will be discarded if TBIT is negated. Operation of the tag compare module 540 and the tag RAM 550 will be better understood in reference to FIG. 6.

Figure 6:
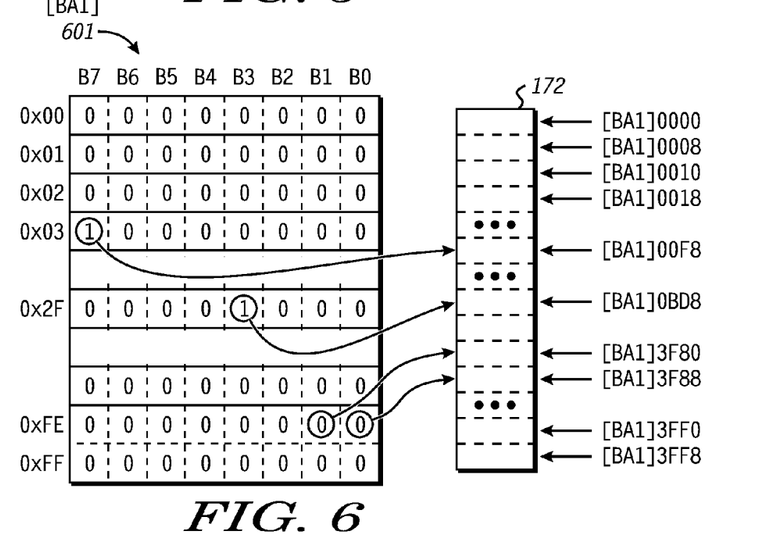
FIG. 6 is a block diagram representing the contents of a memory of FIG. 5 in accordance with a particular embodiment of the present disclosure.

FIG. 6 illustrates, in block diagram form, the local memory 172 of data processor 111 and a portion of the tag RAM 550 referred to as tag RAM 601. The tag RAM 601 includes a plurality of bit locations, each of which corresponds to a 64-bit data word of the local memory 172. It will be appreciated that the plurality of bit locations of the tag RAM 550 can correspond to data word sizes other than 64-bit words. Thus, as used herein, the term "word" as used with respect to a corresponding location of tag RAM is intended to mean any number of bits associated with the corresponding location of tag RAM. Thus, a location of tag RAM 550 can correspond to words having less than 64 bits or more than 64 bits. Thus, assuming a 64-bit word, tag RAM 550 of FIG. 6 includes 2048 bits corresponding to the 2048 64-bit data words of the 16 kB local memory 172. The 2048 bits of the tag RAM 550 are configured as an array of byte wide storage locations, labeled 0x00 through 0xFF, each of which correspond to a tag RAM address. Bit B0 at tag RAM address 0x00 corresponds to the 64-bit data word at local memory 172 address 0x[BA1]0000; bit B1 at tag RAM address 0x00 corresponds to the 64-bit data word at local memory 172 address 0x[BA1]0008; bit B2 at tag RAM address 0x00 corresponds to the 64-bit data word at local memory 172 address 0x[BA1]0010; and so on through bit B7 at tag RAM address 0xFF which corresponds to the 64-bit data word at local memory 172 address 0x[BA1]2FF8.

Figure 7:
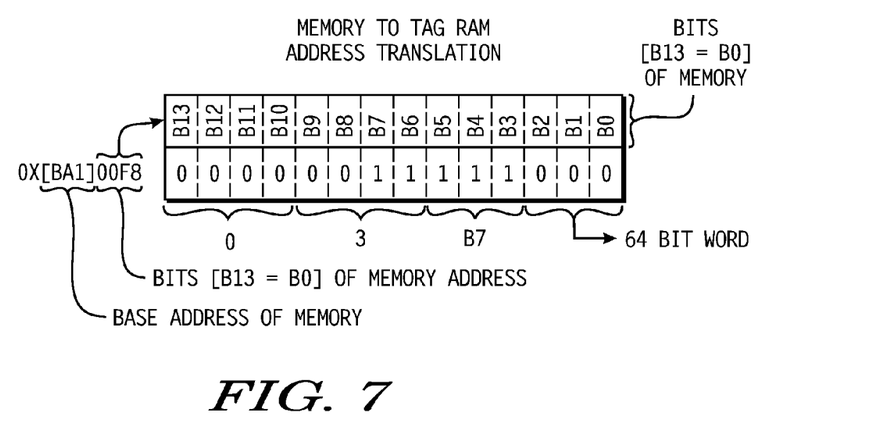
FIG. 7 illustrates a mapping of various data trace address bits in a manner used to access a memory of FIG. 5 in accordance with a particular embodiment of the present disclosure.

FIG. 7 illustrates the relationship between tag RAM bits and local memory addresses of memory 172. In particular, FIG. 7 illustrates the address of DOI_1, which includes a base address portion [BA1] and 14 least-significant bits [b13:n0]. The base address portion 0x[BA1]00F8 is translated, e.g., by tag RAM 550, to determine a corresponding portion of tag RAM 550 where filter information is stored. For example, the base address portion [BA1] can be used to determine a corresponding base address of the tag RAM 550. For simplicity, a corresponding base address of tag RAM 550 is not illustrated in FIG. 6. However, it will be appreciated that tag memory 601 corresponds to the relevant portion of tag RAM 550 that corresponds to base address [BA1].

Bits b13:b6 of the least significant 13 bits provide the address of tag memory 601 that includes the bit location corresponding to address 0x[BA1]00F8. In the present example, bits B13:B6 indicate that the address of tag memory 601 corresponding to local memory address 0x[BA1]0F8 is 0x03. Bits b5:b3 provide the bit location of the tag RAM byte at tag RAM address 0x03 that corresponds to address 0x[BA1]00F8, which is bit b7. Bits b2:b0 are ignored, as they correspond to the 8 bytes of the 64-bit word of interest. Because the content of address 0x[BA1]00F8 is to be monitored, bit b7 of tag RAM address 0x03 has been programmed to an asserted state. Also, because the content of address 0x[BA1]0BD8 (DOI_2) is to be maintained, bit b3 of tag RAM address 0x2F has also been programmed to an asserted state. No other bits of tag RAM 601 are to be traced, and have therefore been programmed to a negated state to indicate that that all trace information, other than trace information for DOI_1 and DOI_2, can be discarded. Note that even though the tag memory 601 stores a filter criteria that corresponds exclusively to trace information of memory 172, it will be applied globally to data trace information of memory 172, regardless of the processor that performed the access. Thus, it will be appreciated that storage states of tag RAM 550 represent a filter criteria that is globally applied to all data trace messages.

Data trace messages meeting the filter criteria of tag RAM 601 are sent from the tag memory compare module 540 to the debug client interface 510, which in turn stores the data trace information meeting the filter criteria in the global trace buffer 520. In addition, data trace messages meeting the filter criteria of tag RAM 601 are flagged as having been filtered by tag RAM 601. This allows the router 530 to determine data trace information that has been previous filtered by the filtering criteria of tag RAM 550 to be forwarded to the trace message transmitter 560, or stored at memory 570.

Thus, data trace information associated with a word address, or a sub-address of the word address (e.g., a byte address), from local memory 172 is determined to meet a filter criteria of tag RAM 550 in response to the tag RAM bit corresponding to the data trace address of the data trace information being asserted. Data trace information meeting the filter criteria is maintained by tag memory compare module 540 providing the data trace information back to the debug client interface 510 for storage in the global trace buffer 520. In accordance with a particular embodiment, the data trace information will be flagged, e.g., by the tag compare module 540 or the debug client interface 510, as having been processed by the tag compare module 540 so that router 530 will not route the data trace information to the tag compare module a second time. It will be appreciated that there are various ways that the data trace information can be flagged. For example, a designator associated with the data trace information, referred to herein as a transfer code, can be changed to a value that will prevent the router 530 from rerouting the data trace information to the tag memory compare module 540. Conversely, data trace information that does not meet the filter criteria is discarded, e.g., the tag memory compare module 540 does not route the data trace information to the debug client interface.

Figure 8:
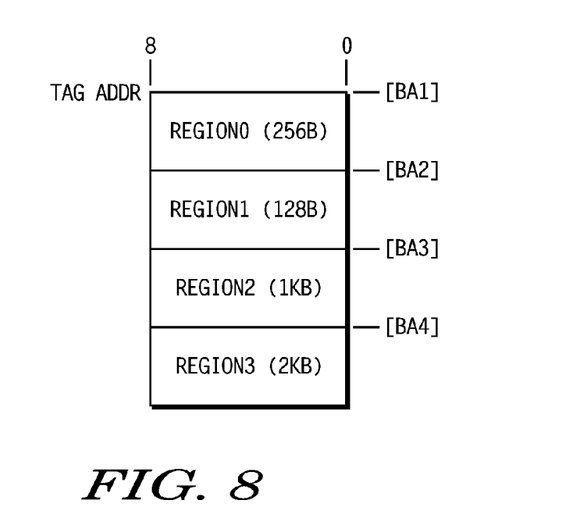
FIG. 8 is a block diagram illustrating a memory map for the tag RAM of FIG. 5 in accordance with a particular embodiment of the present disclosure.

FIG. 8 illustrates a memory map of the tag RAM 550 that includes regions labeled REGION_0 through REGION_3. REGION_0 corresponds to the portion 601 of tag RAM 550 described at FIG. 5 used to filter data trace information for accesses to the local memory of processor 111. REGION_1 corresponds to a portion of tag RAM 550 used to filter data trace information for accesses to the local memory of data processor 112 in the manner described at FIG. 5. REGION_2 corresponds to a portion of tag RAM 550 used to filter data trace information for accesses to the local memory of data processor 113 in the manner described at FIG. L. REGION_3 corresponds to a portion of tag RAM 550 used to filter data trace information for accesses to the system memory 143 of the data processing system 100.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Figure 9:
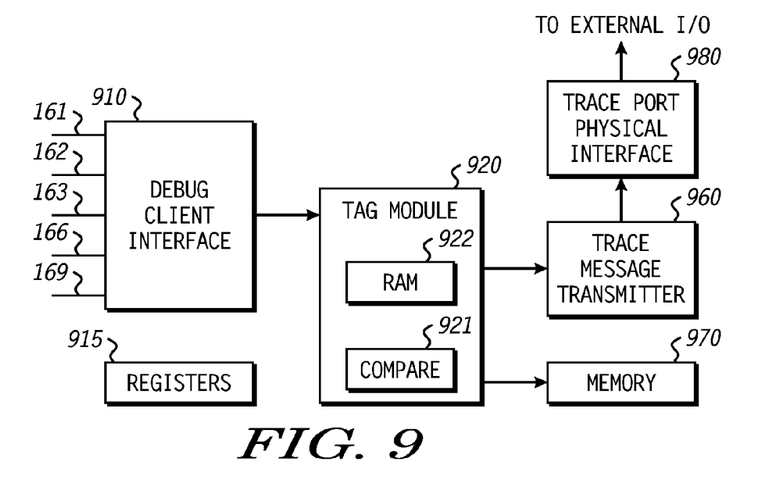
FIG. 9 is a block diagram illustrating an alternate embodiment of a system debug module of FIG. 1 in greater detail.

For example, it will be appreciated that the system debug module 150 can be implemented in various manners. FIG. 9 illustrates an alternate embodiment of the system debug module 150 that does not include a global trace buffer, or a router as illustrated in FIG. 5. The embodiment of the system debug module 150 of FIG. 9 includes a debug client interface 910 that operates in a similar manner as debug client interface 510, a tag module 920, a trace message generator 960 that operates in a similar manner as trace message generator 560, a global I/O control module 980 that operates a similar manner as global I/O control module 580, a memory 970 that corresponds to memory 570, and registers 990.

Data trace information received at debug client interface 910 from a client debug module is forwarded to tag module 920 without being buffered. Tag module 920 includes a tag compare module 921 and tag RAM 922 that operate in a similar manner as tag compare module 540 and tag RAM 550 of FIG. 5, respectively. Thus, data trace information received at the tag module 920 are filtered based upon the global filter criteria stored at tag RAM 922. According to an embodiment, non-data trace information is forwarded from tag RAM 922 without filtering, while each data trace information is filtered by the tag RAM 922. With respect to received data trace information, assuming each data word of the local memory is associated with a corresponding tag bit in tag RAM 922, only those data words having their corresponding tag bit asserted in tag RAM 922 will be forwarded from tag module 922 to one of the tag message generator 960 and the memory 970, while those data words having their corresponding tag bit negated will be discarded.

It will be appreciated, that the tag RAM 550 can be implemented differently than that described in reference to FIG. 5. For example, instead of providing a fixed number of bits for a particular memory or memory range, a smaller tag RAM could be implemented by allowing the tag RAM to be programmable to support filtering of specific portions of client memory, as defined by the user. This can be accomplished through the use of programmable base addresses and memory sizes. For example, the tag RAM can include one or more registers that can be programmed to store address ranges that are to be globally filtered by the system debug module 150. For example, such a register defining an address range to be filtered by the tag RAM can include: a base address field; and a size field, that indicates the beginning and end of a memory region to be further filtered, which can include a word size field that indicates how many bytes of local or system memory correspond to each bit of the TAG RAM 150, e.g., how many bytes in a data word. The ability to assign tag RAM address space in this manner facilitates using the tag compare module 540 to filter only a desired portion of local or system memory 172. The manner in which data trace information not represented in a tag RAM programmed in this manner 550 is filtered can vary, and will be better understood with reference to FIG. 10.

Figure 10:
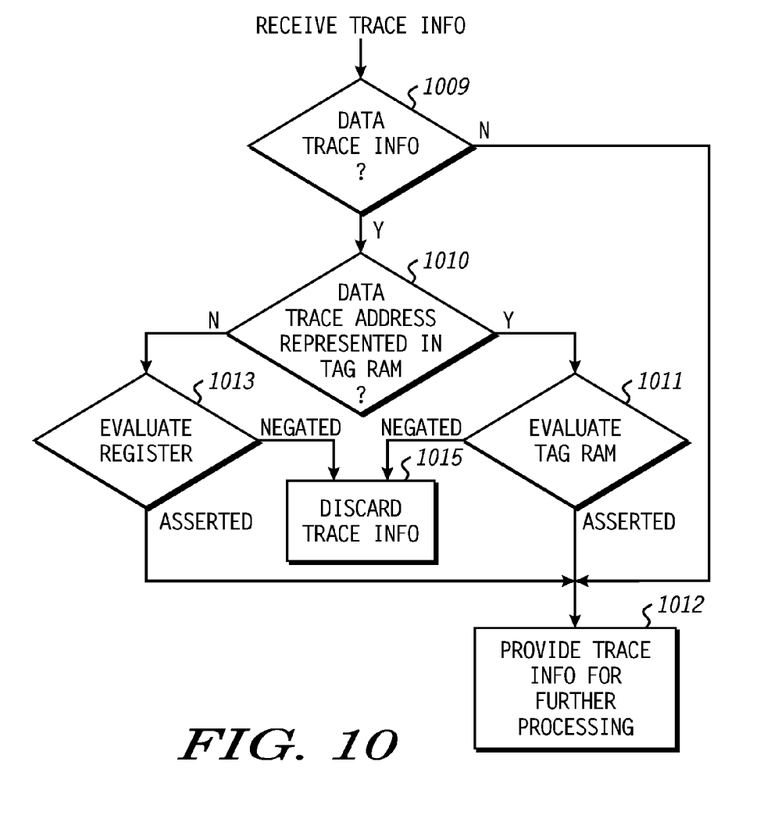
FIG. 10 is a flow diagram of a method in accordance with an embodiment of the present disclosure.

At block 1009 of FIG. 10, it is determined whether or not received trace information is data trace information. If so, flow proceeds to block 1010; otherwise, flow proceeds to block 1012 where the trace information is further processed. At block 1010, it is determined whether a data trace address of the received data trace information is represented in the tag RAM for example, it is determined whether a register of the tag RAM has been configured to include an address range that corresponds to the data trace address of the data trace information being processed. If not, flow proceeds to block 1013; otherwise, flow proceeds to block 1011 where the data trace information is further evaluated, e.g., filtered, by the filter criteria stored at tag RAM.

At block 1011, if the tag bit that corresponds to the data trace address is asserted, the data trace information meets the filtering criteria and is maintained, wherein flow proceeds to block 1012; otherwise, if the tag bit is negated, flow proceeds to block 1015 and the current data trace information is discarded.

However, if it was determine at block 1010 that the received data trace address was not represented in tag RAM, flow proceeds to block 1013 wherein a field of a register, such as a field of register 915, is evaluated to determine whether or not the data trace information is to be maintained. For example, if the register field is asserted all data trace information not having a corresponding bit in tag RAM, e.g., data trace information not represented in tag RAM 922, is to be maintained; otherwise, flow proceeds to block 1015 if the register field is negated all data trace information that does not have a data trace address represented in tag RAM 922, where the data trace information is discarded.

Figure 11:
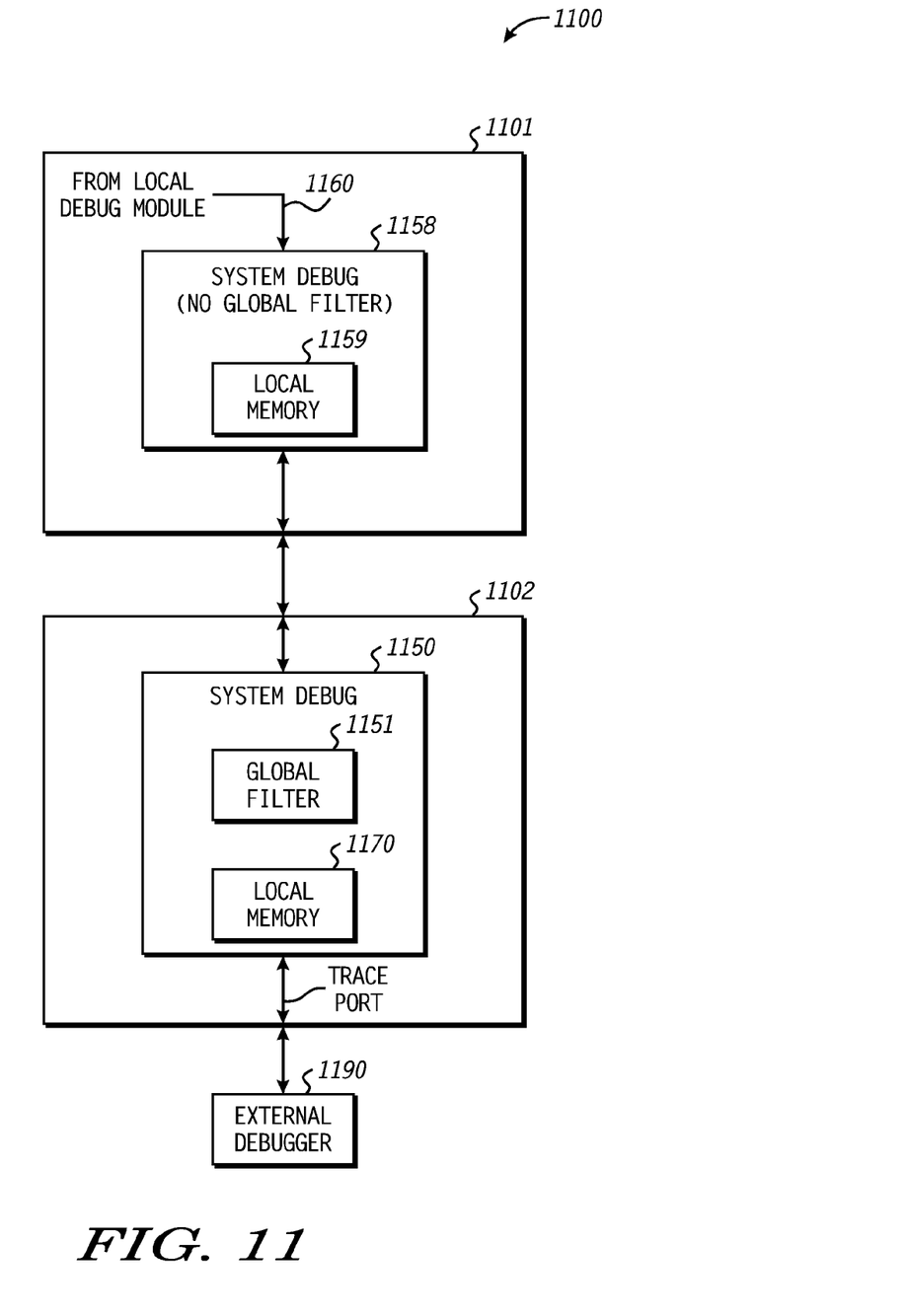
FIG. 11 is a block diagram of a processing system in accordance with an alternate embodiment of the present disclosure.

It will be appreciated that the various features described herein, such as the features illustrated at FIG. 5, and at FIG. 9, can be implemented at one or more integrated circuit die. For example, the tag RAM 550 and its control logic can be disposed at a separate integrated circuit die from the system debug module, master devices, and slave devices. In another embodiment, an integrated circuit die can be implemented that does not include the global filter, but that is instead connected to a different integrated circuit die that does includes a system debug controller that does include a global filter. For example, FIG. 11 illustrates a processing system 1100 that includes a first integrated circuit die 1101 and a second integrated circuit die 1102. Integrated circuit die 1101 includes a system debug module 1158 that does not include a global filter, but that otherwise can be the same as the device of FIG. 1. The system debug module 1158 can be connected to a plurality of debug modules to receive trace information from a plurality of masters as previously described. Thus, integrated circuit die 1101 does not apply a global filter to data trace information received from the various local debug modules.

Integrated circuit 1102 includes a system debug module 1150 that is connected to the global filter 1158 of integrated circuit die 1101. For example, the debug module 1158 can be configured to provide unfiltered data trace information it receives from its local debug modules to the system debug module 1150, such as via a system memory location (not shown) or directly. The system debug module 1150 filters the data trace information received from the system debug module 1158 in the manner previously described, before providing the filtered data trace information to the external debugger 1190, or other destination. It will be appreciated that the integrated circuit die 1102 can include the same or different components as those described with reference to the embodiments illustrated at FIG. 5 and at FIG. 9. For example, the integrated circuit die 1102 can have one or more client debug modules that provide trace information to system debug module 1150 for further filtering and handling. Alternatively, the integrated circuit die 1102 does not need to include other client debug modules.

In a first aspect, a method can include receiving a plurality of trace information from a plurality of debug modules of a processing system, each debug module providing trace information for a different data processor based upon a filtering criteria that is local to that debug module, and applying a common filtering criteria to each trace information of the plurality of trace information to determine which trace information is to be discarded; wherein the common filtering criteria is applied irrespective of the debug module from which the trace information was received.

In one embodiment of the first aspect, the method includes storing the plurality of trace information at a memory buffer prior to applying the common filtering criteria. In another embodiment, the method includes storing the trace information that is not discarded at the memory buffer subsequent to applying the common filtering criteria. In still another embodiment, the method includes storing the trace information that is not discarded at a memory buffer subsequent to applying the common filtering criteria. In a further embodiment, the method includes applying the common filtering criteria includes determining that a write access data trace information is to be discarded based upon an address of the write access data trace information.

In a further embodiment of the first aspect, the method includes applying the common filtering criteria further includes applying the common filtering criteria to write access trace information but not to read access trace information. In still another embodiment, the method includes applying the common filtering criteria includes applying the common filtering criteria to write access trace information but not to read access trace information. In yet another embodiment, the method includes applying the common filtering criteria includes determining which trace information from each of the plurality of debug modules is to be discarded based upon information stored at a tag RAM. In an even further embodiment, the method includes storing filtering information at a tag RAM, and applying the common filtering criteria includes determining which trace information is to be discarded based upon the filtering information stored at the tag RAM.

In a particular embodiment of the first aspect, the method includes a fixed portion of the tag RAM corresponds to a specific range of addresses. In a more particular embodiment, the method includes storing the filter information at the tag RAM includes storing an address range of the tag RAM that corresponds to at least a portion of the processing system's address range, wherein data trace information having an address within the programmed address range are filtered by the stored filter information. In an even more particular embodiment, the method includes whether data trace information not having an address within the address range stored at the tag RAM is discarded or maintained based upon a logic state of a storage location.

In a second aspect, the processing system can include a plurality of local debug modules each coupled to a corresponding data processor, and each local debug module to generate local data trace information for its corresponding data processor based upon a corresponding local data trace filtering criteria being met. The processing system can also include a storage location that is not local to the plurality of local debug modules to store a global data trace filter criteria, and a system debug module coupled to the plurality of local debug modules and to the storage location, the system debug module to apply the global data trace filter criteria to determine which local data trace information of the generated local data trace information meets the global data trace filter criteria.

In one embodiment of the second aspect, the system debug module includes a trace buffer to store the local data trace information received from the plurality of local debug modules, and a filter module that accesses the local data trace information from the trace buffer to apply the global data trace filter criteria. In another embodiment, the filter module is connected to the trace buffer to store local data trace information meeting the global data trace filter criteria. In yet another embodiment, the system debug module includes a filter module filters that the local data trace information received at the global debug module without buffering the local data trace information.

In a further embodiment of the second aspect, the processing system includes local data trace information of the local debug module is to include address information for a write access and a data value written by the write access, each local debug module. The system further includes a message generation module that generates a data trace message that includes the local data trace information, and an interface module to transmit the data trace message from the debug module for receipt by the system debug module. In particular embodiment, the system debug module resides at a different integrated circuit die than does the plurality of local debug modules, and system debug module further includes a debug port of the integrated circuit die including the local debug modules to communicate local data trace information from each of the plurality of debug modules to the system debug module. In another particular embodiment, the storage location is a tag RAM, and the system debug module includes a global filter module that determines a local data trace information meets the global data trace filter criteria by determining if a single bit location of the tag RAM is asserted that corresponds to an address of the data trace information.

In a third aspect, a processing system can include a first data processor coupled to a first debug controller and a second data processor coupled to a second debug controller, a method can include transmitting, to a third debug controller, a first set of trace information of the first data processor that meets a first data trace filtering criteria implemented by the first debug controller. The method can also include transmitting, to the third debug controller, a second set of trace information of the second data processor that meets a second data trace filtering criteria implemented by the second debug module, and discarding, at the third debug controller, a portion of the first set of trace information and a portion of the second set of trace information that do not meet a third data trace filtering criteria.

As used herein, the term "corresponding" when used in reference to an individual item of a plurality of items and another item is intended to mean the existence of a one-to-one relationship. For example, the phrase "each data processor of the plurality of data processors is connected to a corresponding local memory" is intended to indicate that each data processor of the plurality of data processors is connected to a different local memory than any other one of the data processors. Similarly, the phrase "each data processor of a plurality of data processor is to perform a task based upon a corresponding register value", it is to be understood, that each data processor would be perform the task using a value from a different register location.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
storing filtering information, including a filter address range, at a storage location;
receiving a plurality of trace information from a plurality of debug modules of a processing system that has a processing system address range, each debug module providing trace information for a different data processor based upon a filtering criteria that is local to that debug module; and
applying a common filtering criteria to each trace information of the plurality of trace information to determine, based upon the filter address range of the filtering information corresponding to at least a portion of the processing system address range, which trace information is to be discarded; wherein the common filtering criteria is applied irrespective of the debug module from which the trace information was received.

2. The method of claim 1 further comprising:
storing the plurality of trace information at a memory buffer prior to applying the common filtering criteria.

3. The method of claim 2 further comprising:
storing trace information that is not discarded at the memory buffer subsequent to applying the common filtering criteria.

4. The method of claim 1 further comprising:
storing trace information that is not discarded at a memory buffer subsequent to applying the common filtering criteria.

5. The method of claim 1, wherein applying the common filtering criteria includes determining that a write access data trace information is to be discarded based upon an address of the write access data trace information.

6. The method of claim 4, wherein applying the common filtering criteria further includes applying the common filtering criteria to write access trace information but not to read access trace information.

7. The method of claim 1, wherein applying the common filtering criteria includes applying the common filtering criteria to write access trace information but not to read access trace information.

8. The method of claim 1, wherein storing the filtering information includes storing the filtering information at tag RAM.

9. The method of claim 8, wherein a fixed portion of the tag RAM corresponds to a specific range of addresses.

10. The method of claim 9, wherein whether data trace information not having an address within the address range stored at the tag RAM is discarded or maintained based upon a logic state of a storage location.

11. A processing system comprising:
a plurality of local debug modules each coupled to a corresponding data processor, and each local debug module to generate local data trace information for its corresponding data processor based upon a corresponding local data trace filtering criteria being met, wherein the generated local data trace information includes address information for a write access and a data value written by the write access, each local debug module further comprising:
- a message generation module that generates a data trace message that includes the local data trace information; and
- an interface module to transmit the data trace message from the debug module for receipt by the system debug module;

a storage location that is not local to the plurality of local debug modules to store a global data trace filter criteria; and a system debug module coupled to the plurality of local debug modules and to the storage location, the system debug module to apply the global data trace filter criteria to determine which local data trace information of the generated local data trace information meets the global data trace filter criteria.

12. The processing system of claim 11, wherein the system debug module comprises:
- a trace buffer to store the local data trace information received from the plurality of local debug modules; and
- a filter module that accesses the local data trace information from the trace buffer to apply the global data trace filter criteria.

13. The processing system of claim 12, wherein the filter module is connected to the trace buffer to store local data trace information meeting the global data trace filter criteria.

14. The processing system of claim 11, wherein the system debug module comprises:
- a filter module to filter the local data trace information received at the system debug module without buffering the local data trace information.

15. A processing system comprising:
- a plurality of local debug modules each coupled to a corresponding data processor, and each local debug module to generate local data trace information for its corresponding data processor based upon a corresponding local data trace filtering criteria being met;
- a storage location that is not local to the plurality of local debug modules to store a global data trace filter criteria; and
- a system debug module coupled to the plurality of local debug modules and to the storage location, the system debug module to apply the global data trace filter criteria to determine which local data trace information of the generated local data trace information meets the global data trace filter criteria, wherein the system debug module resides at a different integrated circuit die than does the plurality of local debug modules, and system debug module further comprises: a debug port of the integrated circuit die including the local debug modules to communicate local data trace information from each of the plurality of debug modules to the system debug module.

16. A processing system comprising:
- a plurality of local debug modules each coupled to a corresponding data processor, and each local debug module to generate local data trace information for its corresponding data processor based upon a corresponding local data trace filtering criteria being met;
- a storage location that is not local to the plurality of local debug modules to store a global data trace filter criteria; and
- a system debug module coupled to the plurality of local debug modules and to the storage location, the system debug module to apply the global data trace filter criteria to determine which local data trace information of the generated local data trace information meets the global data trace filter criteria, wherein the system debug module includes a global filter module that determines a local data trace information meets the global data trace filter criteria by determining if a single bit location of the memory is asserted that corresponds to an address of the data trace information.

17. A method comprising:
- receiving a plurality of trace information from a plurality of debug modules of a processing system, each debug module providing trace information for a different data processor based upon a filtering criteria that is local to that debug module; and
- applying a common filtering criteria to each trace information of the plurality of trace information to determine which trace information is to be discarded, wherein the common filtering criteria is applied irrespective of the debug module from which the trace information was received, and applying the common filtering criteria includes applying the common filtering criteria to write access trace information but not to read access trace information.

18. A method comprising:
- receiving a plurality of trace information from a plurality of debug modules of a processing system, each debug module providing trace information for a different data processor based upon a filtering criteria that is local to that debug module; and
- applying a common filtering criteria to each trace information of the plurality of trace information to determine which trace information is to be discarded; wherein the common filtering criteria is applied irrespective of the debug module from which the trace information was received, and applying the common filtering criteria includes applying the common filtering criteria to write access trace information but not to read access trace information;
- wherein applying the common filtering criteria includes determining which trace information from each of the plurality of debug modules is to be discarded based upon information stored at a first storage location, and whether data trace information not having an address within the address range stored at the storage location is discarded or maintained based upon a logic state of a second storage location.

* * * * *